United States Patent [19]

Summers

[11] Patent Number: 4,998,849
[45] Date of Patent: Mar. 12, 1991

[54] EARTH ANCHOR DRIVING AND REMOVING APPARATUS AND METHOD THEREFORE

[76] Inventor: Eugene R. Summers, Rte. 3, Box 190, Roodhouse, Ill. 62087

[21] Appl. No.: 581,055

[22] Filed: Sep. 12, 1990

[51] Int. Cl.⁵ .............................................. E02D 5/80
[52] U.S. Cl. ...................................... 405/303; 173/39; 173/164; 403/92; 403/102; 403/337; 405/224; 52/157; 279/1 R
[58] Field of Search ............... 405/259, 303, 232, 231, 405/228, 244; 173/39, 42, 38, 46, 26, 28, 163, 164; 52/157; 279/1 R; 403/102, 92, 337

[56] References Cited

U.S. PATENT DOCUMENTS

| | | | |
|---|---|---|---|
| 1,798,163 | 3/1931 | Krenzke | 403/95 |
| 2,501,369 | 3/1950 | Zavatkay | 173/28 X |
| 3,343,612 | 9/1967 | Flowers | 403/337 X |
| 4,697,648 | 10/1987 | Brandt | 173/28 X |
| 4,832,552 | 5/1989 | Skelly | 175/52 X |

Primary Examiner—Dennis L. Taylor
Attorney, Agent, or Firm—Polster, Polster and Lucchesi

[57] ABSTRACT

A Kelly bar adapter for use with earth anchor driving machinery is disclosed. The adapter allows for pivotal connection of an earth anchor or earth anchor extension rod thereto. Thus, a vertically hanging Kelly rod may be attached to an earth anchor or its associated extension rod while the same is diagonally extending out of the ground. A tool for removing earth anchors having an integral eyelet or an eyelet which is threaded onto an earth anchor is also disclosed.

13 Claims, 5 Drawing Sheets

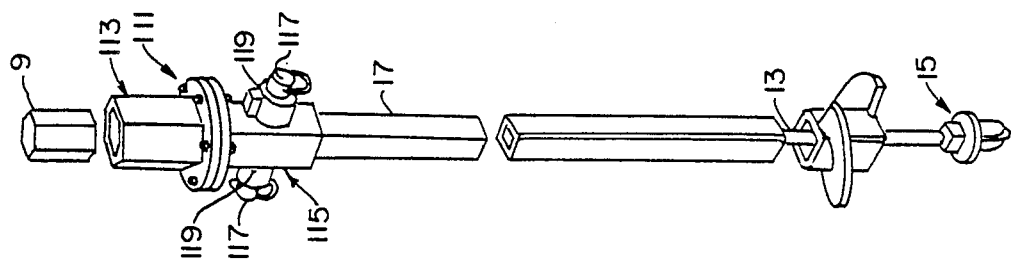
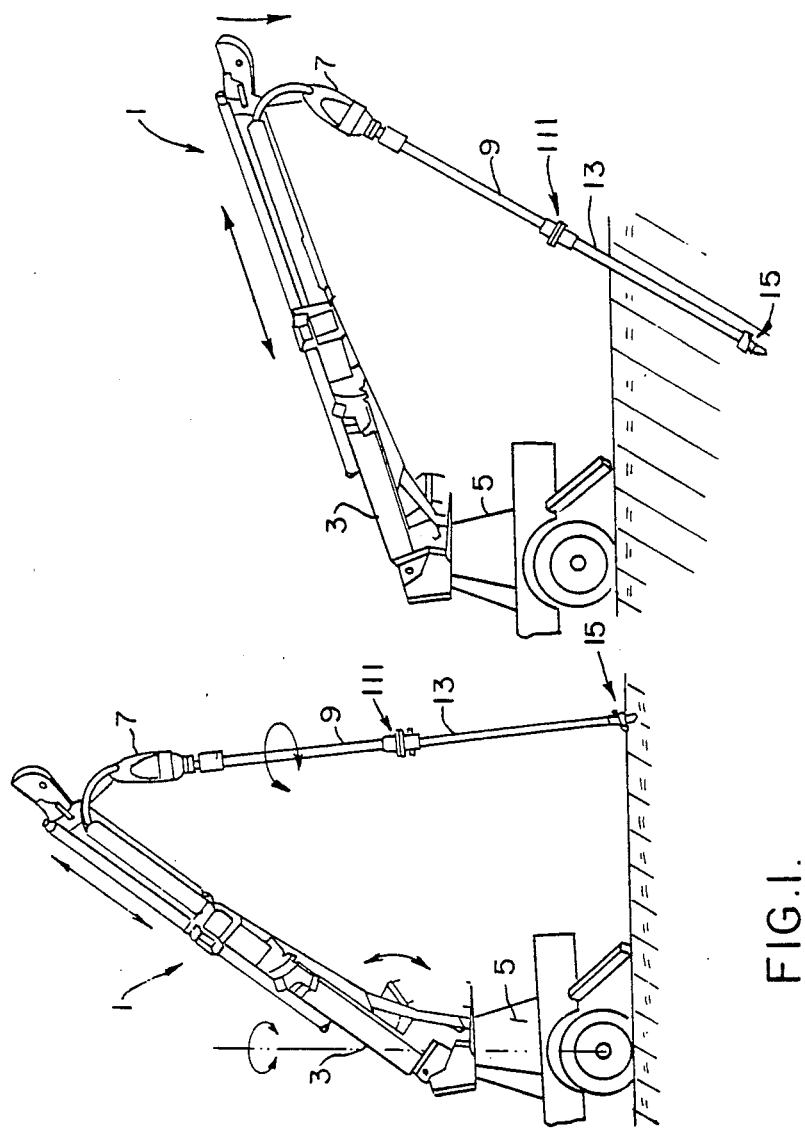
FIG. 3. PRIOR ART.
FIG. 2. PRIOR ART.
FIG. 1. PRIOR ART.

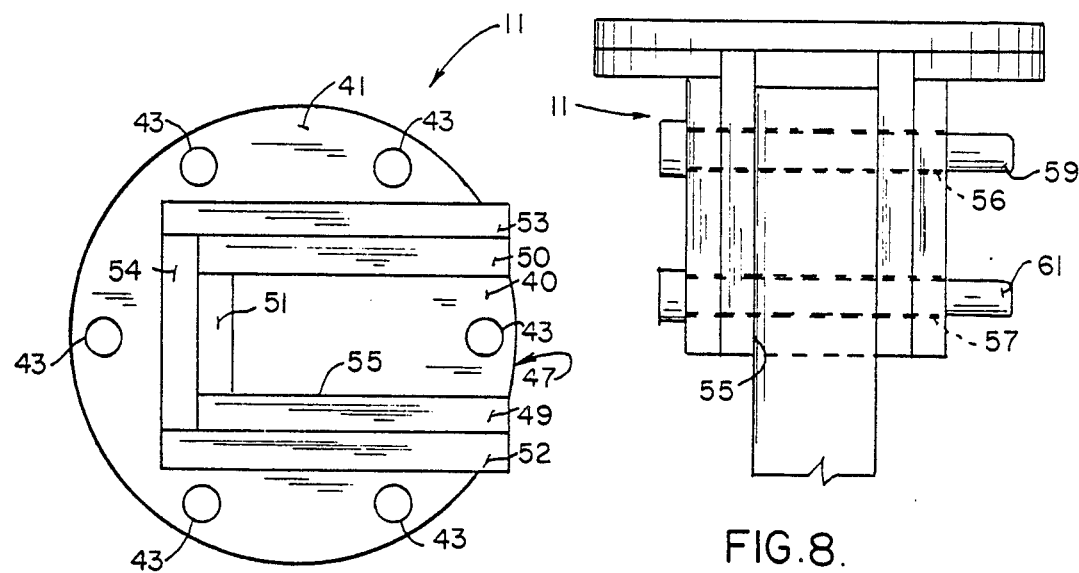
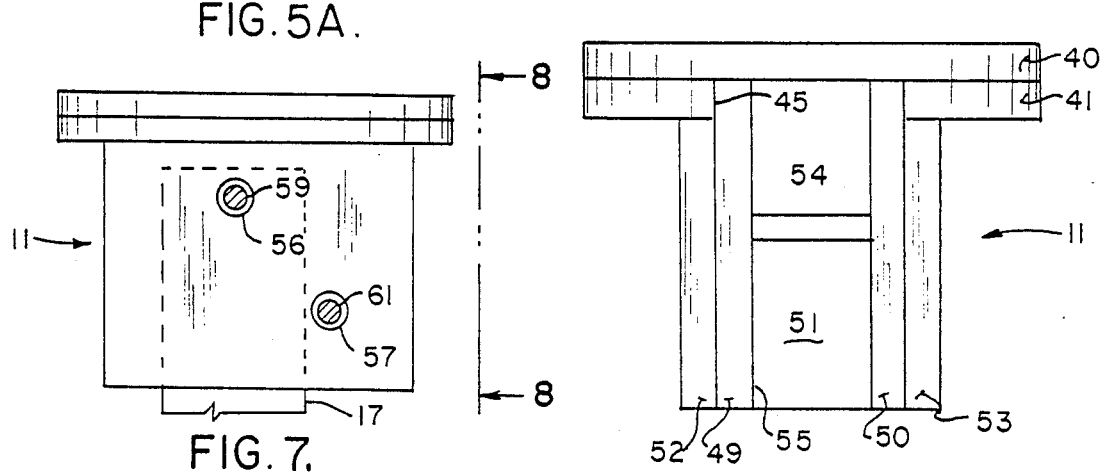
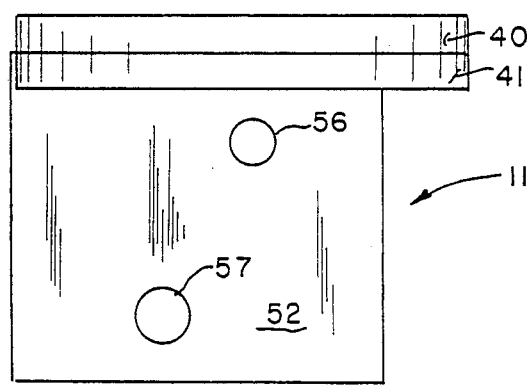
FIG. 5A.  FIG. 8.  FIG. 7.  FIG. 5B.  FIG. 5C.

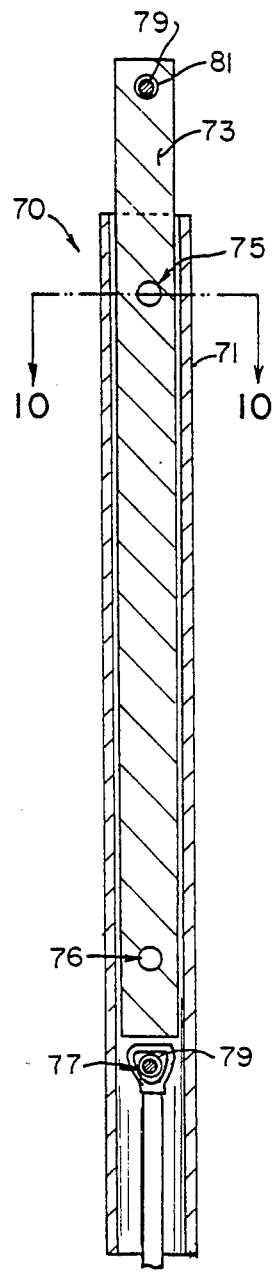
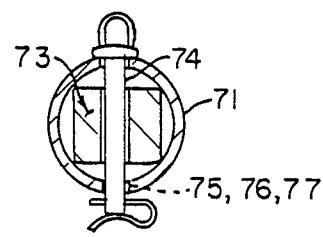
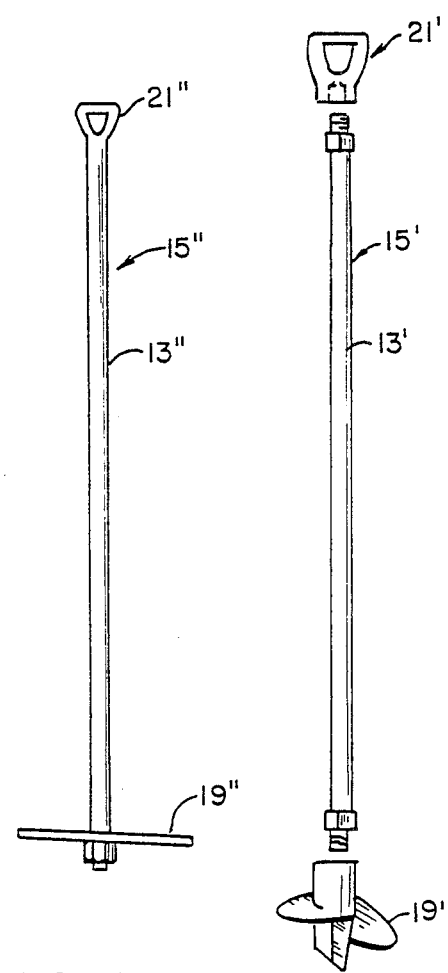
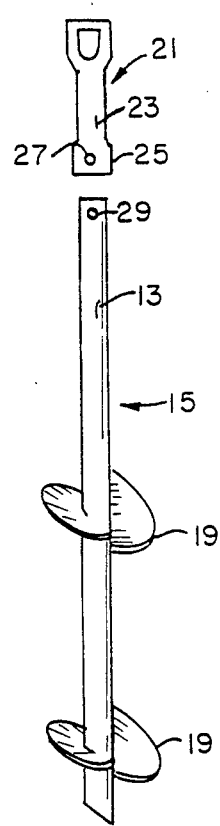
FIG.9.   FIG.10.   FIG.11C.   FIG.11B.   FIG.11A.

EARTH ANCHOR DRIVING AND REMOVING APPARATUS AND METHOD THEREFORE

BACKGROUND OF THE INVENTION

This invention relates to the driving of earth anchors for guy wires or the like into the earth with earth anchor driving machinery to support utility poles and the like, and, in particular, to a Kelly bar adapter for use with such machinery to aid in angularly (obliquely) driving earth anchors into the earth, and for removing earth anchors from the earth.

Earth anchors are commonly used to secure stay rods, cables, guy wires and the like in order to brace utility poles and the like. These anchors are often driven into the ground at an angle such that the anchor is colinear with the guy wire. As can be seen in FIGS. 1-3 which show prior art earth anchor drivers, a service truck or trailer having a hydraulically operable boom carries a hydraulic motor from which a Kelly drive bar is suspended. A Kelly bar adapter is secured to the end of the Kelly bar to connect earth anchors thereto. The anchors are then driven into the ground by rotatingly driving the Kelly bar and the earth anchor. Flights on the anchor drive the anchor into the earth.

Oftentimes, it is desirable to drive the earth anchor deep into the earth using one or more extension rods. In order to do this, the shaft of the earth anchor is separated from the adapter and the extension rod is connected at one end to the shaft and at another end to the adapter. As can be seen in FIG. 3, the extension rod is received within a rigid sleeve of the adapter. The connection between the adapter and the extension rod or anchor shaft is not pivotal. Thus, in order to connect the adapter to the extension rod once the extension rod has been connected to the angularly positioned anchor shaft, the motor, Kelly bar, and adapter must be manually moved into axial alignment with the extension rod so that the extension rod may be attached thereto. This is difficult and physically demanding work.

The same problem of connecting the adapter to the extension rod occurs when the anchor is to be removed. However, this time, it applies also to the earth anchor itself.

SUMMARY OF THE INVENTION

Among the several objects of the invention will be noted the provision of a Kelly drive bar adapter which allows easy connection of the adapter to an extension rod or earth anchor without undue physical strain;

The provision of such an adapter which allows the ready connection of a Kelly bar drive member to an earth anchor or the like which is inclined with respect to the vertical;

The provision of such an adapter which is simple in construction, easy to use, and economical to produce; and The provision of a tool which facilitates the driving or removal of an earth anchor. These and other objects will become apparent to those skilled in the art in light of the following disclosure and accompanying drawings.

In accordance with the invention generally stated, there is provided a Kelly bar adapter for use with earth anchor driving machinery for driving an earth anchor into the earth at a desired angle. The adapter includes a lower portion and an upper portion. The upper portion includes a hollow neck for receiving a Kelly bar which is drivingly connected to a motor suspended from a movable boom of a service truck or the like. The lower portion includes a pair of generally parallel, spaced-apart, downwardly extending side walls defining a channel of sufficient width to receive an extension rod or an earth anchor.

The side walls include upper and lower apertures or holes. These apertures are formed in the side walls so as to be spaced vertically from one another and to be angularly offset with respect to the centerline of the Kelly bar. The upper and lower apertures of each side wall are aligned with one another. The extension bar or the earth anchor to be driven thus may be pivotably connected to the angle adapter via a first pin which extends through the top apertures of the side walls and through a bore in the extension rod or earth anchor regardless of the angular relationship between the Kelly bar and the earth anchor.

With the first pin pivotally connecting the earth anchor to the Kelly bar these last-said members may readily be pivotally moved relative to one another so as to be in substantial coaxial alignment. A second pin is then inserted through the lower apertures thereby to hold said earth anchor in coaxial alignment with the Kelly drive bar.

In accordance with another aspect of the invention, there is provided an earth anchor driving or removal tool for driving further into the earth or removing from the earth an earth anchor having an eyelet integral with, or threadably connected to, the earth anchor at the top thereof. The tool may be used with the above described Kelly bar adapter.

This last-mentioned tool comprises an elongate hollow tube having an inner diameter sufficiently wide to receive the earth anchor eyelet, and an elongate rod. The elongate rod, which is preferably square in cross-section, is received within the tube and is connected thereto by means of a clevis pin which extends through a bore in the tube and the earth anchor eyelet.

A method of readily attaching an earth anchor to a Kelly drive bar is also disclosed.

BRIEF DESCRIPTION OF THE DRAWINGS

FIGS. 1 and 2 are side elevational views of earth anchor driving machinery depicting a prior art two step method of driving an earth anchor diagonally into the ground using a prior art Kelly bar adapter;

FIG. 3 is a perspective view of a prior art Kelly bar adapter;

FIGS. 5A, 5B and 5C are bottom plan, front elevational, and side elevational views, respectively, of the Kelly bar adapter of the present invention;

FIG. 7 is a side elevational view similar to that of FIG. 6 showing the Kelly bar adapter holding a shaft in a colinear (coaxial) relation to a Kelly bar;

FIG. 8 is a front elevational view of the Kelly bar adapter taken along line 8—8 of FIG. 7;

FIG. 9 is a longitudinal cross-sectional view of an anchor rod removal tool of the present invention;

FIG. 10 is a cross-sectional view of the anchor rod removal tool taken along line 10—10 of FIG. 9;

FIGS. 11A–11C are elevational views illustrating three types of earth anchors that may be used in accordance with this invention;

Corresponding reference characters indicate corresponding parts throughout the various views of the drawings.

DESCRIPTION OF THE PREFERRED EMBODIMENT

Figure 4:
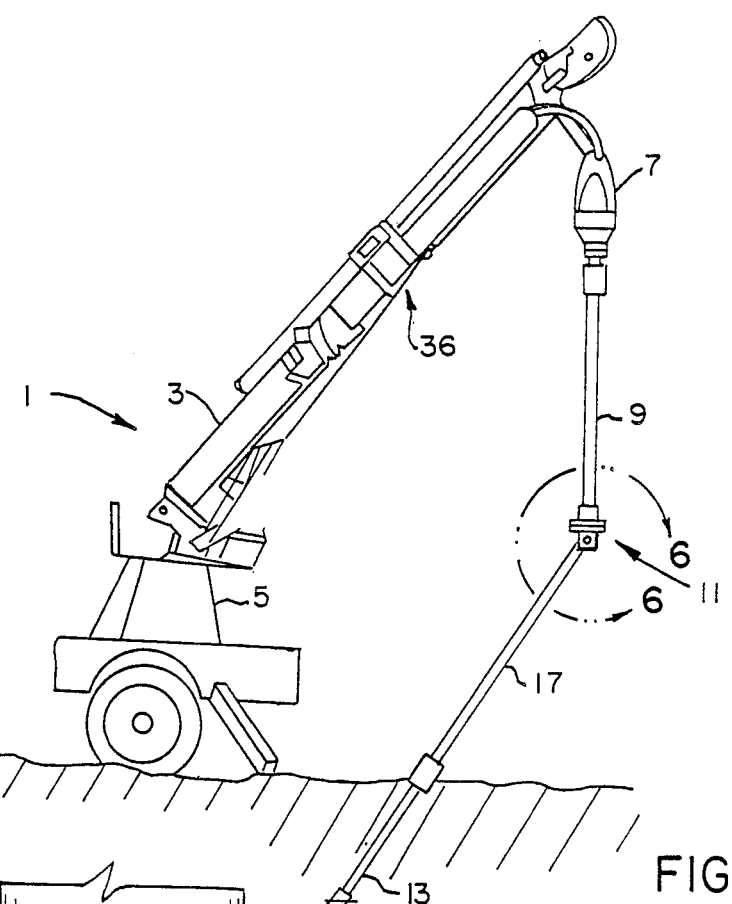
FIG. 4 is a side elevational view of earth driving apparatus using a Kelly bar adapter of the present invention.

Referring initially to FIGS. 1 and 2, reference numeral 1 generally indicates earth anchor driving machinery including a hydraulically movable boom 3 mounted to a service truck, trailer, or the like 5. Boom 3 has a hydraulic motor 7 supported therefrom. A Kelly drive bar 9 is suspended from the motor 7 to be rotated by the motor. As shown in FIGS. 1–3, a prior art Kelly bar adapter assembly 111 connects the shaft 13 of an earth anchor 15 or an extension rod 17 (see FIG. 4) to the Kelly bar 9. As is well-known to those skilled in the art, boom 3 may be extended or retracted, may be pivotally raised and lowered, and may be rotated about a vertical axis (as shown by the arrows in FIGS. 1 and 2) so as to properly position motor 7 and Kelly bar 9 to do a desired task.

Three different embodiments of conventional earth anchors are indicated at 15, 15' and 15" and are respectively shown in FIGS. 11A-11C. In FIG. 11A, it can be seen that earth anchor shaft 13 has flights 19 attached at the bottom thereof and an eyelet 21 attached at the top thereof. Flights 19 may be welded to the shaft, bolted to the shaft, or threaded onto the shaft. An eyelet 21 is connected to shaft 13 by a pin (not shown) which extends through aligned holes 27, 29 in the eyelet and shaft 13, respectively. Alternatively, as shown in FIG. 11B, an eyelet 21' may be threadably connected to shaft 13', or as shown in FIG. 11C an eyelet 21" may be integrally formed with shaft 13". Earth anchor 15, as shown in FIG. 11A, is the anchor most commonly used and is the anchor with which my Kelly bar adapter is intended to be used.

Prior art Kelly bar adapters 111 include an upper sleeve 113 and a lower sleeve 115. Upper sleeve 113 is sized and shaped to receive Kelly bar 9, which, as shown in FIG. 3, may be of hexagonal cross section. Lower sleeve 115 is sized and shaped to receive an earth anchor shaft or extension rod 17. A pair of pins 117 are received in pin bosses 119 of lower sleeve 115 and extend through pin holes 29 in the earth anchor shaft or extension rod to hold the same in lower sleeve 115. It will be seen that lower sleeve 115 fully surrounds the portion of extension rod 17 or earth anchor shaft 13 that is received therein. Thus, the extension rod or earth anchor cannot pivot with respect to Kelly bar 9 and the Kelly bar and extension rod or earth anchor must be coaxially aligned in order to connect the two together. As explained above, this requires that the Kelly bar and its associated adapter 111 be pushed into alignment with the extension rod or earth anchor when they are extending diagonally out of the ground.

FIGS. 4–8 show a Kelly bar adapter 11 of the present invention. Kelly bar adapter 11 includes means for allowing the extension rod or earth anchor shaft to pivot with respect to the Kelly bar, thus facilitating connection of the extension rod or earth anchor shaft to Kelly bar adapter 11. More specifically Kelly bar adapter assembly 11 includes a top portion 31 and a bottom portion 33 which are connected by a plurality of bolts 34. Top portion 31 includes a hollow sleeve 35 sized and shaped to receive Kelly bar 9. Sleeve 35 is mounted on an upper plate 37. Lower portion 33 includes plate assembly 39 having a first and a second plate 40, 41 both of which are circular in plan. Plates 37, 40 and 41 include bolt holes 43 which receive bolts 34 to hold the two portions 31, 33 together.

Referring to FIGS. 5A-5C, plate 41 includes an off-center, rectangular groove 45 extending from the front 47 thereof approximately three-quarters of the way to the rear thereof. Groove 41 receives inner side walls 49, 50 and inner back wall 51. The inner walls are flanked by outer side walls 52, 53 and outer back wall 54. The side walls form a channel 55 which is sufficiently wide to receive earth anchor 15 or extension rod 17. It will be seen that the side walls, back walls, and plate assembly 39 could all be formed from a single layer of metal rather than from two layers as is preferred.

Figure 6:
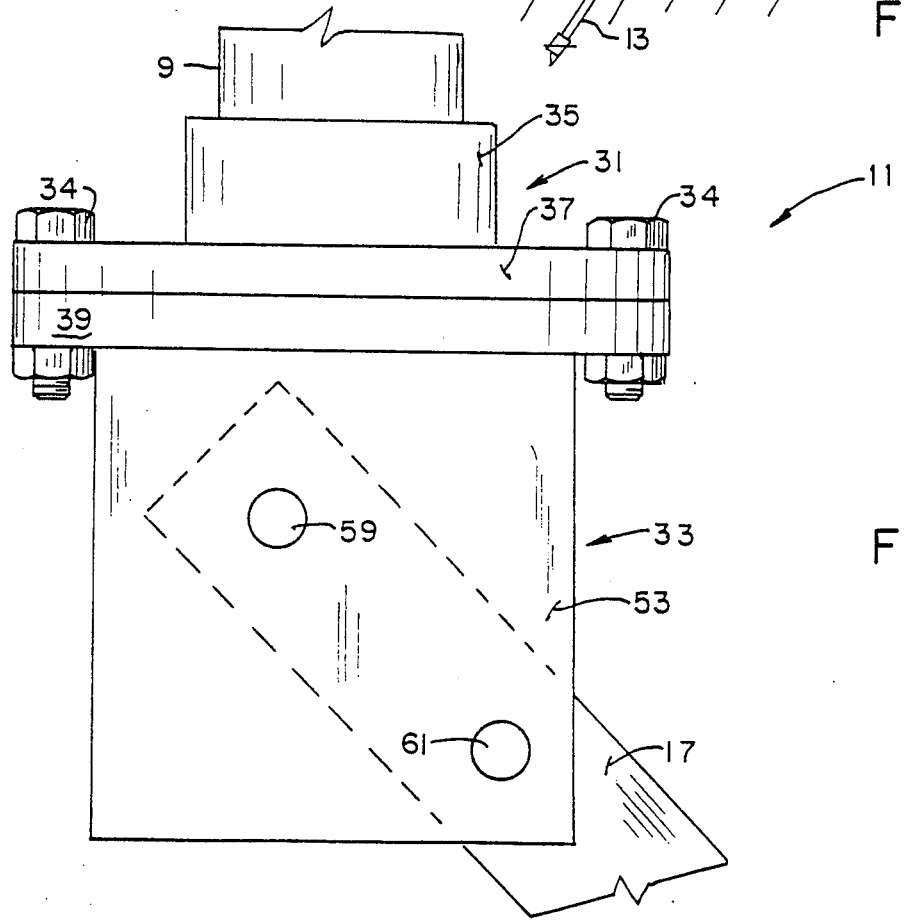
FIG. 6 in an enlarged side elevation view of the Kelly bar adapter, taken along line 6—6 of FIG. 4, holding a shaft at an angle.

Inner back wall 51 only extends a portion of the way up outer back wall 54 thereby exposing a portion of outer back wall 54 (FIG. 5B). The side walls 49, 50, 52 and 53 each include a pair of pin holes 56, 57 which are angularly spaced with respect to each other (i.e. one is above and behind the other) to receive a pair of clevis pins 59, 61, bolts, or the like (FIG. 8). Pin 59 is received through pin hole 56 and shaft bore 29 to pivotably connect earth anchor 15 or extension rod 17 to the adapter 11 and Kelly bar 9 (FIGS. 4, 6). Pin 61 is used to hold earth anchor 15 or extension rod 17 in a colinear relationship with Kelly bar 9 (FIGS. 7, 8) for driving the earth anchor into the ground. By pivotably holding earth anchor 15 or extension rod 17, Kelly bar adapter lower portion 33 allows the connection of the Kelly bar 9 to the anchor or extension rod while the Kelly bar is hanging vertically and the anchor or extension rod is extending out of the earth at an angle (FIG. 4). This eliminates many of the problems in aligning prior art Kelly bar adapters to extension rods and anchors when they extend diagonally out of the ground.

To drive an earth anchor into the ground, an anchor 15 is secured to Kelly bar adapter lower portion 33 via clevis pin 59 extending through side wall pin holes 56 and anchor shaft bore 29. Pin 61 is inserted to hold the anchor 15 and Kelly bar 9 colinearly as in FIGS. 7 and 8. With the boom 3 raised and with the earth anchor 15 vertical, as shown in FIG. 1, the anchor is partially driven into the ground. Then by lowering and extending boom 3, anchor 15 is brought to its desired angle and driven the rest of the way into the ground, leaving anchor shaft bore 29 exposed.

Pins 59 and 61 are then removed to disconnect anchor 15 from adapter 11 and extension rod 17, if required, may be connected to anchor 15. Boom 3 is raised and extended or retracted as needed to align adapter 11 with the top of extension rod 17. With Kelly bar 9 hanging vertically, extension rod 17 is connected thereto by a single pin 59 inserted through pinholes 56, and through a bore in extension rod 17 (FIGS. 4, 6).

Boom 3 is then lowered and extended as required until extension rod 17 and Kelly bar 9 are colinear (FIGS. 7, 8). Then, a second pin 61 is inserted through holes 57 to prevent extension rod 17 and Kelly bar 9 from pivoting with respect to each other and anchor 15 is driven the rest of the way into the ground.

Removal of the anchor from the ground works in much the same way. With the top bore of the extension rod 17 exposed, the extension rod is connected to lower portion 33 of adapter 11 through pinhole 56 and pin 59 while Kelly bar 9 is hanging vertically from boom 3. Boom 3 is then lowered and extended until Kelly bar 9 is colinear with rod 17. Pin 61 is then inserted through pinhole 57 to keep rod 17 and Kelly bar 9 from pivoting with respect to each other and the extension rod is removed from the ground. The extension rod is then disconnected from anchor 15 and adapter 11 and the steps are repeated to remove the anchor form the ground.

Although anchor 15" of FIG. 11C is not commonly used, there are many such anchors in the ground. Anchor 15" includes an anchor shaft 13" which is threaded at one end thereof to receive a plate 19" at the bottom thereof and an eyelet 21" at the top thereof. When anchor 15" is to be replaced or removed, anchor shaft 13" is generally unscrewed from plate 19", and the shaft 13" is removed, leaving plate 19" in the ground. If the shaft cannot be separated from the plate, the anchor rod 13" is driven further into the ground. Because these anchors cannot be directly connected to adapter 11 or prior art Kelly bar adapters, a removal or driving tool 70 of the present invention (FIGS. 9 and 10) is used for removal of the shaft 13". Tool 70 also has limited uses on shaft 13' of FIG. 11B. Tool 70 includes an outer cylindrical tube 71 of sufficient width to receive eyelet 21" of anchor 15", as shown in FIG. 9 in the lower end thereof. A square, elongate drive rod 73 is received within the top of tube 71 and is connected thereto by two clevis pins 74 which extend through pin holes 75 and 76 in tube 71 and rod 73. The upper end of rod 73 is connected to the Kelly bar adapter 11 by a pin 79 inserted through a hole 81 in the upper end of rod 73 which is aligned with upper holes 56 in the side walls of lower portion 33. The lower end of rod 73 within tube 71 is positioned above holes 77 in tube 71 so that as the open lower end of tube 71 is lowered onto the upper end of earth anchor 15", eye 21" will be aligned with holes 77 when the upper end of the anchor abuts against the bottom of rod 73. Another pin 79 may be passed through holes 77 in tube 71 and through the eye 21" of anchor 15" so as to connect the anchor to tool 70 and to permit the extension rod to be rotatingly driven in either direction by hydraulic motor 7 via Kelly bar 9 and adapter 11 of the present invention. In this manner, the extension rod may then be driven further into the ground or removed from the ground as desired in the same manner described above. It will be appreciated that pin 79 is not used if anchor rod 15" is to be driven into the ground. Tool 70 may under certain conditions also be used directly with anchor 15' shown in FIG. 11B which has an eyelet 21' threadably connected to anchor shaft 13'. Neither of the anchors 15' or 15" have a holes similar to holes 29 in anchor 15. Earth anchor 15", as shown in FIG. 11C, is the anchor with which tool 70 is preferably used.

Figure 12:
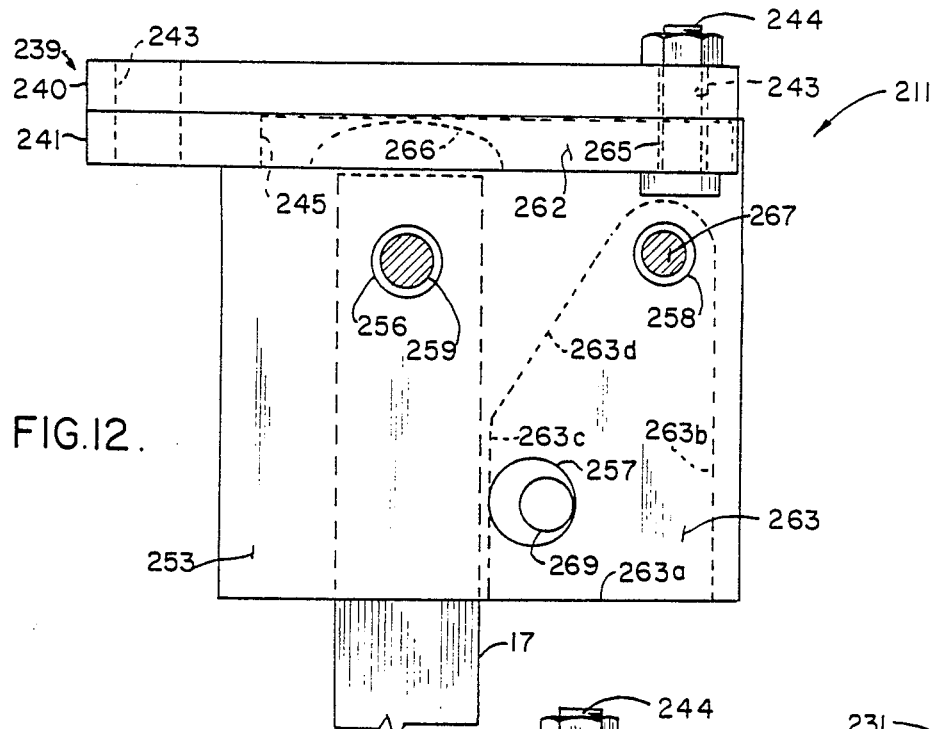
FIG. 12 is a side elevational view of second embodiment of the Kelly bar adapter equipped with an alignment means and a stop.
Figures 13, 15:
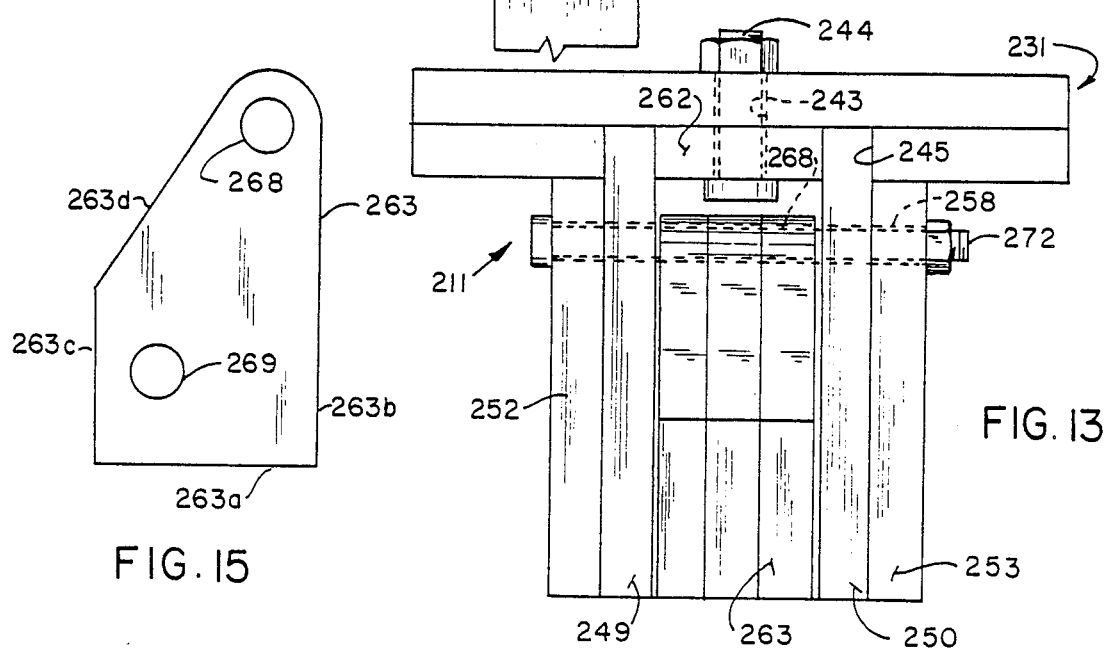
FIG. 13 is a front elevational view of the Kelly bar of FIG. 12 with the exterior rod or anchor shaft removed.
FIG. 15 is a side elevational view of a tongue disposed within the Kelly bar adapter of FIG. 12.

Turning to FIGS. 12 and 13, a second embodiment of the Kelly bar adapter, as generally indicated at 211, is shown. Adapter 211 includes a plate assembly 239 identical to plate assembly 39 of adapter 11. Side walls having inner plates 249, 250 and outer plates 252, 253 depend from plate assembly 239. Plates 249-253 are similar to plates 49-53. They include upper and lower pin holes 256 and 257, respectively, which are diagonally offset from each other. plates 249-253 also include a third pin hole 258 forward of pin hole 257 and parallel with upper pin hole 256.

Figure 14:
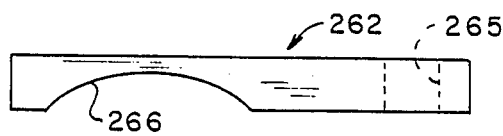
FIG. 14 is a side elevational view of an alignment plate disposed within the Kelly bar adapter of FIG. 12.

Adapter 211 further includes a plate 262 (see FIG. 14) used to aid in aligning the eyelet of extension rod 17 with pin hole 256 and a tongue 263 (see FIG. 15) used to prevent undue pivoting of extension rod 17 within adapter 211. Plate 262 and tongue 263 may be used separately or together. Plate 262 is received in groove 245 of plate 241 of plate assembly 239 between inner side walls 249 and 250. A bolt hole 265, aligned with a plate assembly bolt hole 243 allows for securing plate 262 in adapter 211. When extension rod 17 is received in adapter 211, it buts up against the bottom of plate 262. Stop 262 is sufficiently wide so that when extension rod 17 butts up against it, the eyelet of the extension rod is aligned with bolt hole 256 so that bolt 259 may be passed therethrough to secure extension rod 17 in adapter 211. Plate 262 thus facilitates securing extension rod 17 to adapter 211.

Plate 262 further includes a downwardly facing arcuate groove 266 which extends the width thereof. Groove 266 is formed to be above extension rod 17 to allow extension rod 17 to pivot within adapter 211. As can be seen in FIG. 12, the leading edge of stop 262 is preferably forward of the front of extension rod 17.

Tongue 263 comprises a trapzoidal plate assembly having a horizontal bottom 263a, a vertical forward edge 263b, and a rear edge which has a vertical portion 263c extending from the bottom edge and a diagonal portion 263d which extends between the vertical portion and the front edge. Tongue 263 preferably is made of three identical plates which are welded together to span the width between inner side walls 249 and 250. It includes a pair of bolt holes 268 and 269 which are aligned with pin holes 257 and 258 in the side walls of adapter 211. Bolt hole 269 is preferably smaller in diameter the hole 257.

Tongue 263 is pivotally connected to adapter 211 in front of extension rod 17 by a bolt 267, clevis pin or the like, which extends through bolt holes 258 and 268. A second bolt, pin or the like may be passed through bolt holes 257 and 269 to secure tongue 263 in adapter 211 to prevent it from pivoting. Thus, with bolts, pins or the like extending through both bolt holes 268 and 269, tongue 263 will prevent pivotal motion of extension rod 17 in adapter 211 when such motion is undesired. The second bolt may be removed, allowing tongue 263 to pivot and thus allowing extension rod 17 to pivot in adapter 211 when such motion is desired.

Numerous variations, within the scope of the appended claims will be apparent to the those skilled in the art in light of the foregoing description and accompanying drawings.

What is claimed is:

1. A Kelly drive bar adapter for use with earth anchor driving machinery for driving an earth anchor into the earth at any desired angle or for removing said anchor from the earth, the adapter being connected to a Kelly bar which, in turn, is drivingly connected to a drive motor suspended from a movable boom of a service truck or the like, said adapter comprising:

a pair of spaced apart walls defining a channel of sufficient width to receive a portion of an earth anchor or an extension thereof, said channel being open on at least one side;

means for pivotally connecting said portion of said earth anchor to said adapter regardless of the angle between the axis of said earth anchor and said Kelly bar thereby to permit said Kelly bar and/or said anchor to be readily moved into colinear alignment; and means for holding said Kelly bar and said earth anchor in axial alignment with one another for driving said earth anchor into the earth in coaxial alignment with the Kelly bar.

2. The adapter as set forth in claim 1, wherein said adapter connecting means comprises a top bore and a bottom bore in each of said wall, said bores being spaced from one another relative to the axial centerline of said Kelly bar and being vertically spaced from one another, said earth anchor portion received in said adapter having a hole in alignment with the uppermost of said bores for receiving a first pin, the later constituting said pivotal connecting means.

3. The angle adapter as set forth in claim 2, said holding means including a second pin which when said earth anchor and said Kelly bar are substantially axially aligned may be inserted through said bottom bore in close proximity to said earth anchor for substantially preventing pivotal movement of said earth anchor with respect to said Kelly bar.

4. The angle adapter as set forth in claim 1, said adapter further including means for facilitating connection of said portion of said earth anchor or extension thereof to said angle adapter.

5. The angle adapter as set forth in claim 4, wherein said spaced apart side walls each define a bore therein; said portion of said earth anchor or extension thereof defining a bore at the top thereof; said connection facilitating means comprising a plate received in said channel at the top thereof, said plate being of a sufficient width so that when said earth anchor portion or extension thereof butts up against said plate, said bore of said earth anchor portion or extension is aligned with said side wall bores.

6. The angle adapter as set forth in claim 5, wherein said plate includes a downwardly facing groove positioned to be above said earth anchor portion or extension thereof when in said channel so that said plate will not interfere with the pivotal motion of said earth anchor portion or extension thereof.

7. The angle adapter as set forth in claim 1, wherein said side walls include an upper forward bore, an upper rearward bore, and a lower bore intermediate side upper forward and upper rearward bore; said earth anchor portion or extension thereof including a bore in the top thereof; said earth anchor portion or extension thereof being pivotally connected in said channel by a bolt, pin or the like extending through said upper rearward bore; said holding means comprising a plate pivotally mounted in said channel which may be pivotally fixed in said channel to prevent pivotal motion of said earth anchor portion or extension thereof.

8. The angle adapter as set forth in claim 7, wherein said plate comprises an upper bore in alignment with said side wall upper forward bore and a lower bore in alignment with said side wall lower bore, wherein pins, bolts or the like extend through said plate and side wall bores to positionally fix said plate in said channel.

9. A method of driving an earth anchor and any extension rods associated therewith into the earth at any desired angle, said earth anchor being driven into the earth by suitable earth anchor driving means including a selectively movable boom pivotally mounted on a service trunk or the like, earth anchor driving means carried by said boom, a Kelly bar connected to said driving means to be rotatingly driven thereby; and an adapter for connecting said earth anchor to said Kelly bar, said method comprising the steps of:

(a) pivotally connecting said earth anchor to said Kelly bar;

(b) effecting pivotal movement of said anchor with respect to said Kelly bar so as to bring said earth anchor and Kelly rod into substantially coaxial alignment;

(c) securing said earth anchor and Kelly bar in substantially coaxial alignment;

(d) partially driving said earth anchor into the earth at said desired angle;

(e) disconnecting said earth anchor from said Kelly bar;

(f) securing said extension bar to said earth anchor;

(g) with said Kelly bar hanging vertically, pivotally securing extension rod to said Kelly bar;

(h) moving said boom so as to bring said Kelly bar into substantial coaxial alignment with said extension rod;

(i) securing said Kelly bar and extension rod in such substantially coaxial alignment; and (j) driving said earth anchor and extension rod further into the earth.

10. The method of claim 9 wherein said step of pivotally connecting said earth anchor to said adapter comprises inserting a first pin through adapter and through said earth anchor thereby to permit pivotal movement of said earth anchor relative about said first pin.

11. The method of claim 10 wherein said step of securing said earth anchor and said Kelly bar in substantial coaxial alignment comprises inserting a second pin through said adapter thereby to hold said earth anchor in substantial axial alignment with said Kelly bar.

12. A method of removing an earth anchor means from the earth using conventional earth anchor driving machinery, said driving machinery comprising a selectively movable boom pivotally mounted on a service truck or the like, a motor suspended from said boom, and a Kelly bar depending from said motor to be rotatably driven by said motor, wherein said earth anchor means extends from the earth at an angle offset from the vertical; said method comprising the steps of:

(a) with said Kelly bar hanging vertically from said boom, pivotally connecting said earth anchor means to said Kelly bar;

(b) moving said boom so as to bring said Kelly bar into substantially coaxial alignment with said earth anchor means;

(c) securing said Kelly bar and earth anchor means in substantially coaxial alignment; and (d) back driving said earth anchor so as to remove said earth anchor means from the earth.

13. The method as set forth in claim 12, wherein, if said earth anchor means being removed includes an extension rod, said method further includes:

(e) after said earth anchor has been back-driven an amount sufficient to expose said extension rod, detaching the upper end of said extension rod from said Kelly bar;

(f) removing said extension rod from said earth anchor means remaining in the earth; and (g) repeating steps (a) to (d) of claim 7 with respect to said earth anchor means remaining in the earth.

* * * * *